Sept. 25, 1934.  R. B. SMITH  1,974,880
CLOTH SHADE TESTING DEVICE
Filed Sept. 12, 1932  2 Sheets-Sheet 1
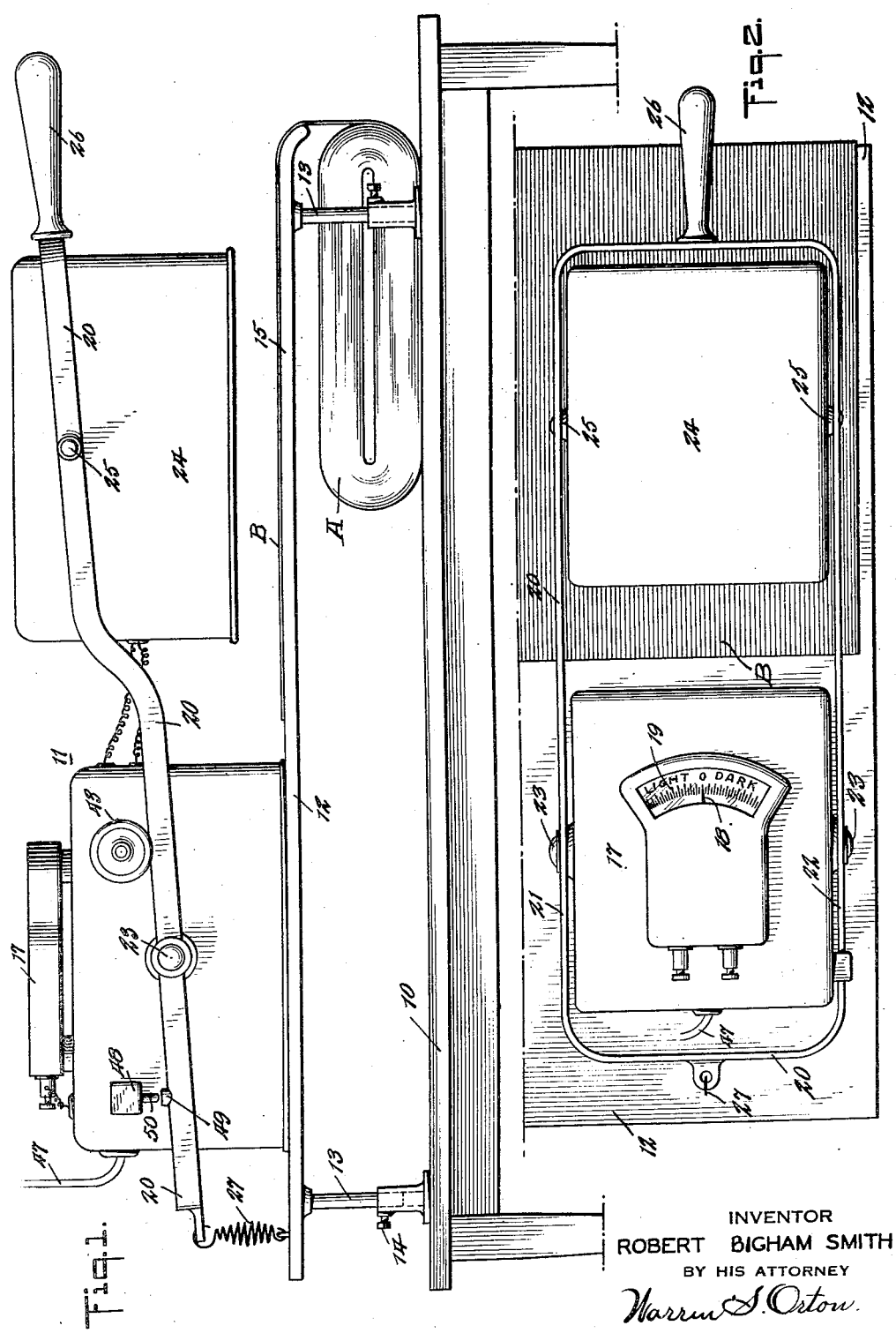
INVENTOR
ROBERT BIGHAM SMITH
BY HIS ATTORNEY
Warren S. Orton.

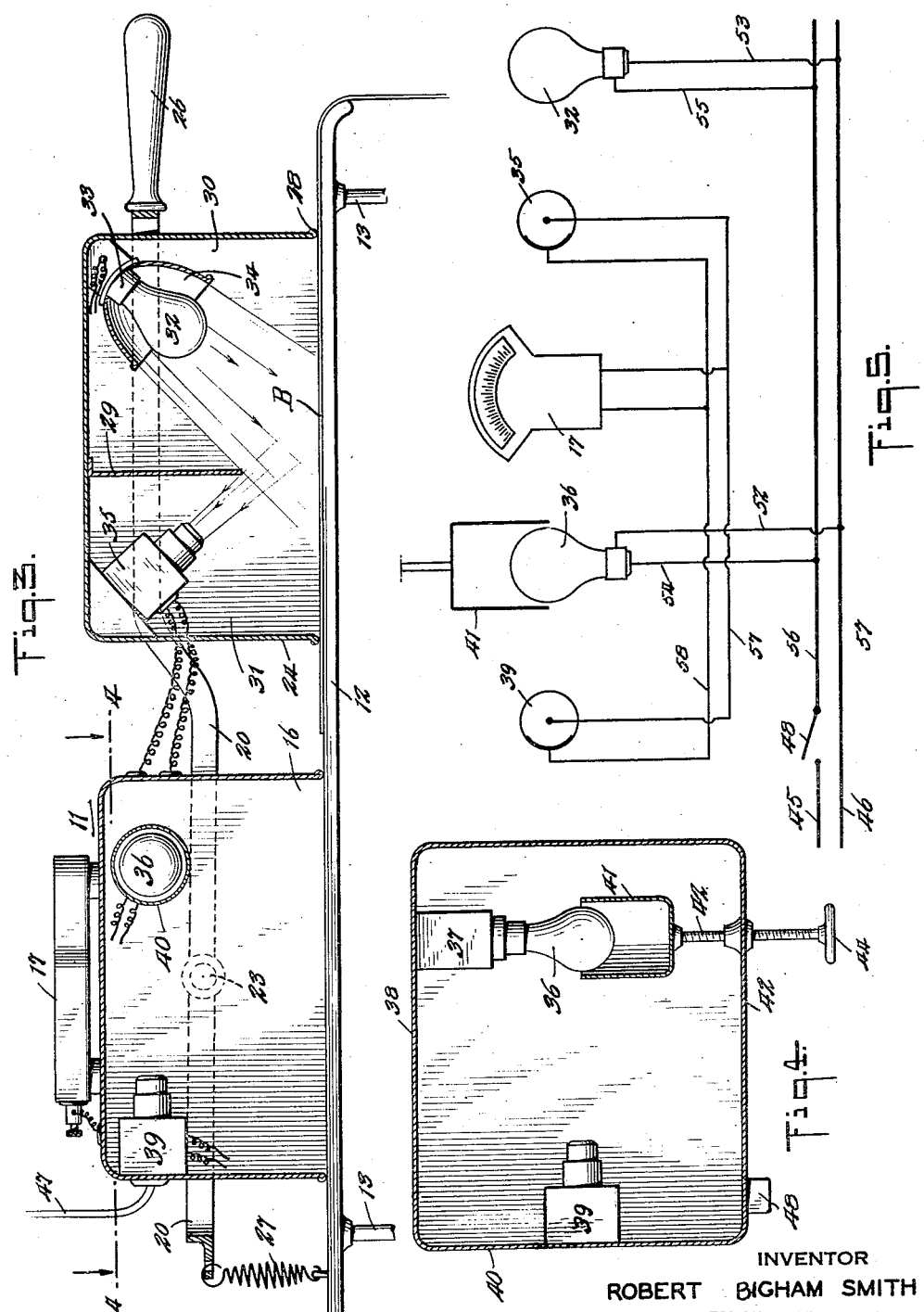

Patented Sept. 25, 1934

1,974,880

UNITED STATES PATENT OFFICE 1,974,880

CLOTH SHADE TESTING DEVICE

Robert Bigham Smith, Atlanta, Ga., assignor to Weston Electrical Instrument Corporation, Newark, N. J., a corporation of New Jersey Application September 12, 1932, Serial No. 632,767

11 Claims. (Cl. 88—14)

The invention relates in general to a photometric device constituting a light comparator for comparing color shades of materials with a predetermined standard shade and the invention specifically relates to a device for testing cloth and like fabrics in bulk to ascertain their degree of adherence to or variation from a preselected or standard shade of any particular color.

In certain industries, such for instance as in the manufacture of cloth and other fabric, the material is manufactured in large bolts and it is a requirement that goods of the same classification have the same color tones and shade to match a sample color effect.

The primary object of the invention is to provide a simple form of device by means of which bolt after bolt of material may be quickly compared to a standard or desired shade or color tone without necessity of cutting a sample from or otherwise mutilating the bolts of material.

Broadly, this feature of the invention is attained by utilizing a light comparator which includes a light sensitive cell normally suspended in a container or hood which can be brought down on to an end portion of a bolt of material without interference from the bulk of material in the bolt. It is also contemplated that there be contained in the hood an associated source of light disposed to illuminate the portion of the material under inspection and to restrict the action of the device for a time duration simply sufficient to cause the comparator to function.

When a light sensitive cell such as is used in comparators of the type herein featured is energized for any material length of time, it becomes heated and loses its efficiency. Accordingly, another object of the invention is to provide for the energizing of the cell for a period of time just sufficient to cause the comparator to function and accordingly the present disclosure features a control which normally will cause the comparator to be inoperative and which will become operative automatically when the comparator is brought manually into operative engagement with the portion of material under test.

Still another object of the invention is to provide readily adjustable means for presetting the selector so as to be responsive to various light intensities within the range of the device.

This phase of the invention is attained by providing a screen or shutter adjustable in such way as to vary the amount of light which is permitted to shine on that cell of the comparator which electrically tends to balance the cell exposed to the light reflected from the material under test.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the accompanying drawings:

Fig. 1 is a view in side elevation of a preferred embodiment of the invention with the material to be tested in place and with the device in its normal, inoperative position;

Fig. 2 is a plan view looking down upon the disclosure in Fig. 1;

Fig. 3 is a longitudinal, vertical sectional view taken through the showing in Figs. 1 and 2;

Fig. 4 is a horizontal, sectional view taken approximately on the line 4—4 of Fig. 3; and Fig. 5 is an explanatory view showing the arrangement of the electric circuits formed by the parts in the preceding figures.

In the drawings there is shown a support 10 in the form of a table vertically adjustably mounted on which is a cantilever form of superstructure 11 including a platform 12 and vertically adjustable relative to the support by means of standards 13 secured in vertically adjustable position by nut screws 14. In operation the platform 12 is so adjusted relative to the support 10 that the major portion of a bolt of goods A may be contained in the space beneath the one end 15 of the platform. In those situations where it is desired to have a clear, unrestricted space to receive the bolts and into the side of the clearance, the adjacent standards 13 shown at the right of Fig. 1 may be omitted and in this case the support 12 will constitute a cantilever platform supported solely by means of a pair of standards 13 at the left of the showing in Fig. 1. Positioned on the portion of the platform 12 adjacent the left standards 13 is a closed casing or compartment 16 hereinafter referred to as a balancing compartment. Positioned on top of this compartment 16 is a galvanometer 17 of conventional design having its indicator pointer 18 movable across an exposed scale 19 suitably graduated to indicate on one side of its zero mark degrees of light and on the other side degrees of dark.

A closed rectangular rocking frame 20 has its opposite longitudinally extending arms 21 and 22 pivotally mounted on opposite sides of the compartment 16 on pivot pins 23. Pivotally mounted between the portion of the frame 20 which projects beyond the casing 16 which overlaps the extension 15 of the platform is an open bottom box-like container or hood 24, pivotally mounted to and between the arms 21 and 22 on pivot pins 25. The end of the frame which contains the hood 24 is provided centrally thereof with a handle 26 positioned above the adjacent end of the platform 15. A coiled spring 27 is positioned between the opposite end of the frame 20 and the adjacent portion of the platform 12 and tends normally to maintain the hood 24 in position spaced slightly above the part of the platform 15 on which the goods to be tested is laid.

The hood 24 is a box-like open bottom metallic shell with the bottom spring outlined by a strengthening bead 28. The hood is internally provided with a depending opaque partition 29 which constitutes a light shield dividing the interior of the hood into a light source containing compartment 30 and a cell containing compartment 31. A lamp 32 is screwed into a socket 33 in the compartment 30 and constitutes a source of light for illuminating the portion of the cloth to be tested. A reflector 34 surrounds the lamp 32 and is disposed to direct a beam of light downwardly and towards the center of the open bottom of the hood. A photosensitive cell 35 is positioned in the compartment 31 and in position to receive light from source 32 after it has been reflected from the surface under test as indicated by the arrowed lines in Fig. 3.

The casing 16 is of similar construction to the hood 24 except that it is intended to be secured permanently to the platform 12. Positioned within the casing 16 is a lamp 36 secured to a socket 37 mounted on a side wall 38 of the casing and constituting a source of light, arranged to illuminate a photosensitive cell 39 secured to an end wall 40 of the casing.

For the purpose of varying the intensity of light directed on to the cell 39 from its light source 36, a cylindrical shield 41 is disposed to telescope the lamp 36 and more or less intercept and thus control the amount of light permitted to reach the cell 39. This shield 41 is mounted at the inner end of a screw 42 threaded through the side 43 of the casing opposite the side 38. The shield is manipulated to advance or retreat the shield by means of a thumb nut 44 accessible on the outside of the casing. The electrical parts thus described are interconnected as illustrated in Fig. 5 and are supplied from an external source of electric energy as by means of the leads 45 and 46 contained in a cable 47. The sources of light 35 and 37 are controlled automatically by a normally open plunger switch 48 operatively controlled by the arm 20 and so disposed that when the sensitive hood 24 is lowered into operative position as shown in Fig. 3 a wear plate 49 on arm 20 will elevate the plunger 50 of the switch to close the circuit through the sources of light. A suitable spring contained in the switch 48 opens the circuit when the sensitive head is elevated or permitted to be lifted into its normal elevated inoperative position as shown in Fig. 1. Tracing the electrical connections in Fig. 5, it will be noted that from one side of the source of energy conductor 51 beyond the switch leads through branches 52 and 53 respectively through the lamps 36 and 32 and thereafter through branches 54 and 55 back through lead 56 and switch 48 to the other lead 45. The light sensitive cells 35 and 39 are connected in series by means of conductors 57 and 58 with the galvanometer 17 shunted between the cells as is usual in such constructions.

Before operating the device it is necessary to first set it to the required intensity of light which is to match the intensity of light required of the goods to be tested. Starting with a standard piece of material beneath the sensitive hood 24, the hood is lowered into position to engage the standard to the platform and thus hold the same. By manipulating the screw head 44 and observing the galvanometer indicator 18, the screw 42 is advanced or withdrawn to adjust the shield 41 relative to the lamp 36 until the potential of the current generated by the cells 35 and 39 are balanced which zero potential condition of the cell circuit will be indicated by the pointer 18 assuming a substantially steady position at the zero point of the scale 19. When this happens the device is ready to test the materials comparable with the standard.

In operation, bolt after bolt of material will be moved on to the support 10 and the loose end B of the bolt will be slipped into position on top of the platform 15 and beneath the elevated sensitive hood 24. The operator grasps the handle 26 and quickly lowers the hood until the beaded edge 28 is in pressing engagement with the end portion B of the material beneath the same. This will first have the effect of clamping the end B under inspection flat down on the platform 15 and in this way all portions of the material exposed to the inside of the hood will be stretched flat and thus freed of wrinkles which would affect the light reflected therefrom. The sides of the hood act as a spacing means. Every succeeding piece of material under test will be uniformly spaced from the light source 32 and from the photocell 35. This uniformity in repeatedly setting the cell at a fixed distance from the goods under test avoids an error which might otherwise be introduced by unequal spacing.

As the sensitive hood is lowered into position, the switch 48 will close the light circuit as above outlined and cause a beam of light to be directed on to the portion of the cloth under test. From this small and uniform area of material under test the light will be reflected to the photosensitive cell 35 and which in turn will generate or tend to generate a current flow in the cell circuit. At the same time, the balancing cell 38 will likewise be subjected to a degree of light previously set in the initial setting of the screen 41 and this cell will, of course, generate or tend to generate current in opposition to the current generated by the cell 35. As is well known in devices of this character, should the light reflected from the particular piece of material under test correspond to the light reflected from the original sample or standard the current potential will be the same as was present during the original setting of the device and there will be no perceptible or material movement of the galvanometer indicator 18. On the other hand, if there is a difference in light intensity reflected from any particular piece of material under test, the difference in reflected light intensities will manifest itself by the predominance of the current from one cell over that from the other and this unequal potential will be indicated by the galvanometer reading. In actual practice some slight permissible variation from the standard or sample is permitted and it is obviously within the scope of the disclosure to graduate the scale 19 into permissible and objectionable variations. Instead of the visual indications of the galvanometer, it is obviously within the scope of the disclosure to otherwise indicate variations from a permissible standard, as by the ringing of a bell or otherwise, indicating that the particular material under test was unsuited and should not be graded and passed with the other acceptable goods.

While there has been shown, and described, and pointed out in the annexed claims, certain novel

I claim:

1. A device for comparing the shade of a piece of goods forming part of a bolt of such goods with a standard shade, the combination of a support, a platform positioned above the support a distance to accommodate a bolt of the goods to be compared between the support and the platform with an end portion of the bolt disposed on top of the platform, means forming an electric circuit including a light comparator comprising two light-sensitive cells, a source of light associated with each cell and means for indicating differences in the electrical responses of the two cells, one of said cells and its associated source of light removable to and from a position over the portion of the platform on which the end portion of the bolt is laid.

2. In a device of the class described, the combination of a support, a superstructure vertically adjustable on the support and providing a clearance between the support and superstructure to accommodate material a part of which is to be tested, said superstructure including a casing and a platform projecting from one side of the casing, a rocking frame carried by said casing, an open bottom hood carried by the frame and movable thereby to and from a position with its open bottom resting on the platform or on a portion of the material under test and in turn positioned on the platform, and photoelectric mechanism contained partly in the casing and partly in the hood, the photoelectric mechanism within said hood comprising a source of light and a photoelectric cell positioned to receive light reflected thereto by the portion of material on the platform.

3. In a device of the class described, the combination with a support on which material to be tested is laid, an open bottom hood, means tending to maintain the hood suspended in elevated position above the support, manually actuated means for lowering the hood towards the support, and a photoelectric cell contained in the hood and exposed to light reflected from the material beneath the hood, of means for automatically illuminating the material under test as the hood is lowered into testing position, said means forming a light circuit including a source of light in the hood, a control switch and means connected to the switch and actuated by the lowering and raising of the hood for automatically causing said source to emit light as the hood is lowered and to extinguish the light as the hood is restored to its normal elevated position.

4. In a photometric device for testing sheet material, a casing having an open bottom adapted to be placed upon the material to be tested, a photoelectric cell and a light source within said casing, shield means between said cell and light source, and an electrical network including said cell and an instrument responsive to the electrical output of said cell as determined by light reaching said cell from the test material exposed by the open bottom of said casing; said network including a second photoelectric cell, a light source and adjustable means for regulating the electrical output of said second cell.

5. The invention as claimed in claim 4, wherein said adjustable means comprises a tubular sleeve and means for adjusting said sleeve to telescope said second light source to a desired extent.

6. In a photometric device, the combination with a platform on which sheet material to be tested may be placed, a casing having an open bottom, means supporting said casing for movement towards and away from said platform, an electric lamp within said casing for illuminating material exposed through said open bottom, a photoelectric cell within said casing, means shielding said cell from direct illumination by said lamp, an electrical instrument responsive to the electrical output of said cell, a circuit for said lamp and including a switch, and a switch operator connected to said casing for closing said switch when said casing is moved to engage material on said platform.

7. In a photometric device, the combination with a support upon which material to be tested may be placed, of a hood having a lower edge conforming to the upper surface of said support, thereby to exclude extraneous light from the interior thereof when said hood engages said support or sheet material located thereon, means supporting said hood for movement to and from said support, a source of light and a photoelectric cell within said hood, means shielding said cell from direct illumination by said light source, and indicating means including an electrical instrument responsive to the electrical output of said cell as the same is determined by light reflected thereto from material on said platform.

8. In a photometric device, a casing having an open bottom, a second casing, means mounting the first casing for vertical displacement with respect to the other casing, a light source and a photoelectric cell in each casing, shield means within said first casing restricting the illumination of the cell therein to light rays reaching the said cell from the direction of the open bottom thereof, and an electrical circuit including said cells and an instrument responsive to changes in the electrical outputs thereof.

9. A photometric device for testing sheet material wound into bolt form, said device comprising a platform and legs supporting the same to leave clearance for the insertion of a bolt beneath the same when the end of the bolt is placed on said platform, an open bottomed casing, lever mechanism pivotally supporting said casing for movement to and away from said platform, an illuminating means and a photoelectric cell within said casing, and an electrical network including said cell and an electrically responsive instrument.

10. The invention as claimed in claim 9, in combination with spring means normally retaining said casing in elevated position above said platform.

11. A photometric device for testing sheet material wound into bolt form, said device comprising a platform and legs supporting the same to leave clearance for the insertion of a bolt beneath the same when the end of the bolt is placed on said platform, an open bottomed casing, lever mechanism pivotally supporting said casing for movement to and away from said platform, an illuminating means and a photoelectric cell within said casing, and an electrical network including said cell and an electrically responsive instrument, a switch for controlling said illumination means, and a switch operator connected to and movable with said casing.

ROBERT BIGHAM SMITH.